United States Patent [19]

Nimberger et al.

[11] Patent Number: 4,745,938
[45] Date of Patent: May 24, 1988

[54] OUTSIDE SEAL AND YOKE VALVE

[75] Inventors: Spencer M. Nimberger; Alan F. Chou, both of Houston, Tex.

[73] Assignee: Precision General, Inc., Houston, Tex.

[21] Appl. No.: 104,170

[22] Filed: Oct. 2, 1987

[51] Int. Cl.$^4$ .................. F16K 43/00; F16K 41/02
[52] U.S. Cl. ..................... 137/15; 137/315; 251/214; 251/225; 251/264; 277/105
[58] Field of Search .............. 137/15, 315; 251/214, 251/215, 221, 223, 225, 264, 274; 277/105, 106

[56] References Cited

U.S. PATENT DOCUMENTS

| | | | |
|---|---|---|---|
| 1,619,335 | 3/1927 | Donnelly | 251/225 |
| 2,694,547 | 11/1954 | MacGregor | 251/264 |
| 2,722,401 | 11/1955 | Till et al. | 251/214 |
| 3,295,856 | 1/1967 | Bredtschneider et al. | 251/214 |
| 3,504,888 | 4/1970 | Bates, Jr. et al. | 251/214 |
| 3,910,553 | 10/1975 | Boylan | 251/214 |
| 3,982,729 | 9/1976 | Tricini | 251/214 |
| 4,156,529 | 5/1979 | Hafele | 251/214 |
| 4,364,543 | 12/1982 | Soya et al. | 137/315 |
| 4,556,196 | 12/1985 | Nimberger | 251/223 |
| 4,597,581 | 7/1986 | Nimberger | 251/214 |
| 4,630,629 | 12/1986 | Nimberger | 251/214 |

OTHER PUBLICATIONS

Publication—M5Y Gauge Valve-OS&Y Construction.
Publication—AGCO Technical Data M5YK Gauge Valve (1985).

*Primary Examiner*—George L. Walton
*Attorney, Agent, or Firm*—Norvell & Associates

[57] ABSTRACT

A valve of the outside seal and yoke variety is provided, with a seal between a bonnet base and a valve body being axially spaced between a valve seating member and mating threads on the valve body and bonnet base. An end of at least one packing bolt is positioned within a cavity formed within the valve body, and prevents the bonnet base from unthreading from the valve body. A yoke threaded to the valve stem is rigidly secured to the bonnet base by a pair of yoke bolts and intermediate supports, and prevents inadvertent rotation of the packing bolts. The assembly technique of the present invention provides an inexpensive yet reliably OS&Y valve with all desired structural components being rigidly connected. The bonnet assembly of the present invention may be utilized with a conventional valve body and pocket design, thereby substantially increasing versatility and reducing manufacturing costs.

17 Claims, 1 Drawing Sheet

OUTSIDE SEAL AND YOKE VALVE

FIELD OF THE INVENTION

The present invention relates to valves having an axially movable valve stem and, more particularly, relates to an improved valve of the outside yoke and seal variety.

BACKGROUND OF THE INVENTION

Conventional valves having a sealing element movable axially into and out of engagement with a stationary seat on the valve body by rotating the valve stem are well known in the art, as disclosed for example in U.S. Pat. No. 4,556,196. The seal in the annulus between the valve stem and bonnet typically provides the seal along the valve stem, while another seal axially positioned between the valve body/bonnet threads and the valve seating element provides the valve body/bonnet seal. These valves are well suited for numerous applications, and have been widely accepted in various industries.

For certain applications, however, a valve having an outside yoke and seal (an OS&Y valve) may be preferred. In an OS&Y valve, the valve stem seal is held in place by an assembly external of the valve body and bonnet base, and accordingly the valve stem seal may be tightened or replaced without disturbing the valve body/bonnet base connection. OS&Y valves are also well known in the art, as typified by the AGCO M5Y Gauge Valves.

A significant deterrent to the further acceptance of OS&Y valves relates to their high manufacturing costs. OS&Y valves are typically fabricated from a specially constructed valve body, so that a reliable connection can be effected between the valve body and the bonnet base. Another disadvantage of prior art OS&Y valves is the poor reliability of the thermoplastic seal between the valve body and the bonnet base.

The disadvantages of the prior art are overcome by the present invention, and techniques are hereinafter disclosed for forming an improved OS&Y valve which achieves high reliability and comparatively low manufacturing costs.

SUMMARY OF THE INVENTION

In one embodiment, the OS&Y valve of the present invention includes a metallic valve body/bonnet base seal spaced axially between the mating valve body/bonnet base threads and the valve seating element on the valve body, with a similarly positioned backup elastomeric seal adjacent the metal seal. This design allows for the construction of a reliable OS&Y valve utilizing a conventional valve body and pocket design, thereby substantially reducing manufacturing costs and increasing versatility. A valve body of a conventional valve may thus be used with little or no modification to form an OS&Y valve according to the present invention.

The above described OS&Y valve design presents obstacles with respect to the practicle design and function of the bonnet assembly components, which obstacles are further overcome by the present invention. Threads on the bonnet base are utilized to rigidly secure the bonnet assembly to the valve body. An end of one of a pair of packing bolts is positioned within a specially formed cavity in the upper surface of the valve body, thereby preventing bonnet/valve body rotation. A yoke is connected to the bonnet base by a pair of yoke bolts, with a yoke support for each bolt providing the desired rigidity. End faces of the yoke engage square heads of the packing bolts, thereby preventing inadvertent rotation of the packing bolts.

According to the method of the present invention, the bonnet base having a valve stem is threadably connected to the valve body, and sufficient torque applied to make up both a reliable metal seal axially spaced between the threads and the valve seat, and an adjacent elastomeric seal. Opposite pairs of threaded apertures in the bonnet base are selected for receiving the packing bolts, with a specially formed recess in the valve body aligned with one of the holes receiving an end of one packing bolts and thereby preventing inadvertent rotation of the bonnet base with respect to the valve body. The yoke is threaded on the valve stem and the square heads of the packing bolts aligned to allow the yoke to fit therebetween, at which time the stem is rotated to lower the yoke between the backing bolts, thereby preventing inadvertent rotation of the backing bolts. The yoke is secured to the bonnet base by a pair of yoke bolts and respective yoke supports. Finally the packing nuts are tightened to exert the desired sealing force on the compressible packing adjacent the valve stem.

These and further features and advantages of the present invention will become apparent from the following detailed description, wherein reference is made to the figures in the accompanying drawings.

DETAILED DESCRIPTION OF PREFERRED EMBODIMENTS

The OS&Y valve of the present invention may utilize, with little or no modification, various valve bodies and pocket geometries associated with conventional valves of the "closed bonnet" design. Whether of the OS&Y or of the conventional variety, such valves include a valve stem threadably rotatable and thus axially movable with respect to the valve body, thereby lowering or raising a valve sealing element into or out of sealing engagement with the valve seat. A significant advantage of the present invention is that the cost of manufacturing a reliable OS&Y valve is substantially reduced, since the same valve body and pocket design may be utilized for fabricating both OS&Y and conventional valves. Also, the versatility of the valve has been increased, since an OS&Y valve may be converted into a conventional valve, or visa versa, by changing only the bonnet assembly.

Threads on the bonnet base of the OS&Y valve provide structural connection to the valve body, and accordingly mating threads are provided in the pocket of the valve body. The bonnet base is "torqued down" to the valve body, as explained subsequently, thereby effecting a metal seal between an end of the bonnet base and a ledge in the valve pocket at a location axially between the threaded connection and the valve seat. The above threaded connection may result in the hexagonal bonnet base not being "squared" with the upper surface of the valve body, although this presents no problems with respect to the function of operation of the OS&Y valve, and is typical of conventional valves.

Figure 1:
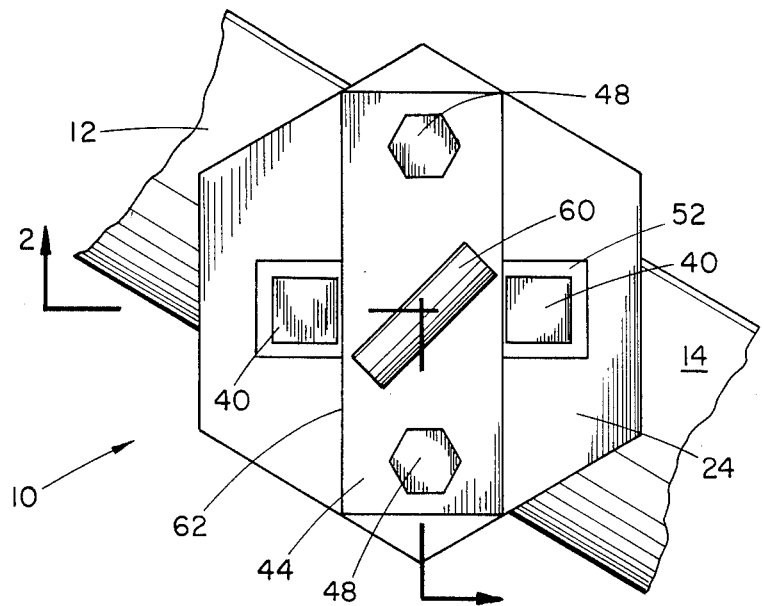
FIG. 1 is a simplified top pictorial view of an OS&Y valve according to the present invention.

Referring to the simplified top view of the OS&Y valve 10 shown in FIG. 1, a valve body 12 having a planar upper surface 14 may be of any geometric configuration, and for exemplary purposes is depicted as having a thin rectangular configuration. The hexagonal bonnet base 24 is threadably connected to the valve body 12, and is in engagement with planar surface 14. A pair of packing bolts each having a square head 40 pass through threaded apertures in the bonnet base 24, and both provide support for the components associated with the packing adjustment and prevent inadvertent rotation of base 24 relative to body 12. A pair of yoke bolts 40 structurally interconnect the yoke 44 to the bonnet base 24. Planar end surfaces 62 of the yoke prevent inadvertent rotation of the packing bolts, as explained subsequently. FIG. 1 also depicts a standard handle 60 for rotating the valve stem.

It should be understood that the components of the bonnet assembly (with the obvious exception of handle 60) are symmetrical about both a center line passing through the packing bolts having the square heads 40, and a center line passing through the yoke bolts 48. As noted above, neither of these center lines may be aligned with the center line of the valve body, since this relationship depends on the angular position of the bonnet base 24 with respect to the valve body 12 when the bonnet base/valve body seal is made as the bonnet base contacts planar surface 14.

Figure 2:
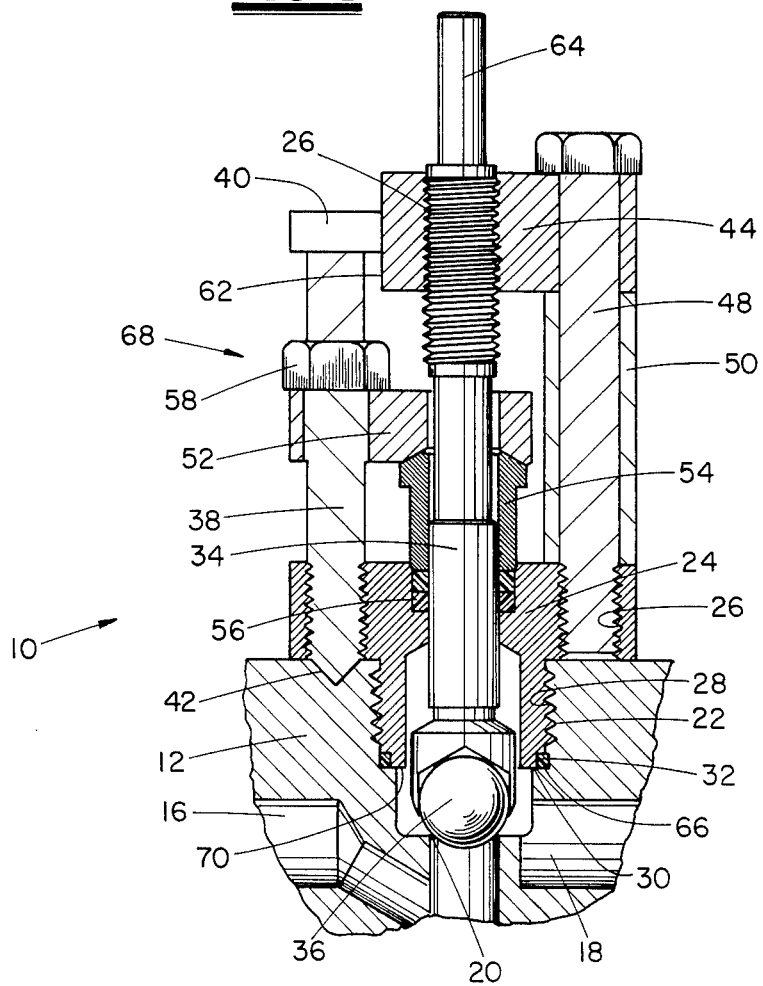
FIG. 2 is a cross-sectional view of the valve body shown in FIG. 1.

FIG. 2 is thus a cross-sectional view taken along line 2—2 of FIG. 1, with the handle 60 removed from the valve stem for clarity. The valve body 12 includes a fluid inlet 16 and a fluid outlet 18 isolated when sealing element 36, which may take the form of a ball, a plug, or other sealing element, is in sealed engagement with valve seat 20. The pocket design of the valve body includes threaded sidewalls 22 adapted for threaded engagement with mating threads 28 on the bonnet base 24. With respect to the central axis 64 of the bonnet assembly 68, the pocket in the valve body also includes a planar ledge surface 66 perpendicular to axis 64 and axially positioned between threads 28 and seat 20 of the valve body. The valve body and pocket design described above thus conforms to the valve body and pocket design of a conventional valve, as disclosed in U.S. Pat. No. 4,556,196 hereby incorporated by reference.

As the bonnet base 24 is torqued to contact the valve body (with the valve stem 34 passing through the opening in the bonnet base 24), the radially outward annular edge of end surface 70 of the bonnet base sealingly engages the radially inward annular edge of ledge surface 66 on the valve body. In addition, a elastomeric ring 32 is simultaneously sandwiched between the bonnet base 24 and the valve body 12, thereby effecting a backup seal.

The bonnet base 24 includes four threaded passageways 26, with the passageways being symmetrically arranged about the axis 64. Two radially opposite passageways receive packing bolts 38, and provide support for packing nuts 58 and packing bar 52. A conical aperture 42 is provided in the valve body 12 as shown in FIG. 2, and an end of one of the packing bolts is positioned within aperture 42 for preventing inadvertent rotation of bonnet base 24 relative to the valve body 12. Rotation of packing nuts 58 thus axially moves packing bar 52, thereby similarly moving packing follower 54 to exert more or less axial pressure on compressible sealing member 56, which may be a conventional packing, to effect a seal between valve stem 34 and bonnet base 24. As those skilled in the art appreciate, additional packing may be added and sealing adjustment of packing 56 effected without disturbing the connection between bonnet base 24 and valve body 12.

Rectangular-shaped yoke 44 is threaded on the valve stem 34, with edge surface 62 preventing rotation of the square heads 40 of packing bolts 38. Rigid structural connection between the yoke 44 and bonnet base 24 is provided by a pair of sleeve-like yoke supports 50 secured between the yoke and bonnet base by a pair of respective yoke bolts 48 threaded to the two remaining threaded apertures 26 in the bonnet base 24. It should be understood that none of the bolts 38,48 are threaded to the valve body 12, as is conventionally done in prior art OS&Y valves.

Referring now to the assembly technique of the present invention, the bonnet base 24 with valve stem 34 passing through the central passageway may be hand threaded to the valve body 12 until the end surface 70 engages the surface 66. The axial spacing between the end surface 70 and the lower planar surface on the bonnet base will be selected with respect to the spacing between the planar surface 14 of the valve body and ledge surface 66 such that surfaces 66 and 70 engage when the lower surface of bonnet base 24 is still slightly above the surface 14 of the valve body, e.g., from 0.005 inches to 0.025 inches, and preferably between 0.008 inches and 0.017 inches. Thereafter, the bonnet base is torqued down onto the valve body until the lower planer surface of the bonnet base engages the planar surface of the valve body.

In its final torqued position, metal deformation has thus occurred between the radially outer edge of surface 70 and the radially inner edge of surface 66, thereby obtaining a reliable metal-to-metal seal. As this torquing operation is effected, the ring member 32, which may be fabricated from Teflon, Graphoil, or other thermoplastic or elastomeric material, is sandwiched between the bonnet base 24 and valve body 12 to provide a reliable backup seal. Both the metal-to-metal and backup seals are thus axially spaced between the bonnet base/valve body threaded connection and the seat on the valve body, as shown. Once sufficiently torqued down, the bonnet base is flush with the valve body, and a rigid mechanical connection thereby formed which does not subject any components of the OS&Y valve to undue vibration or the likelihood of failure when impacted.

Once the bonnet base 24 has been secured to the valve body, two of the at least four threaded passageways 26 through the bonnet base are selected for receiving the packing bolts 38 having the square heads 40. If the upper planar surface 14 of the valve body is sized such that each of the four passageways 26 lies above the surface 14, the selection of two radial opposing passageways for the bolts 38 is not critical. If, however, the valve body is sized such that no or little valve body portion is immediately beneath one or more of these passageways 26 when the bonnet base is torqued to the valve body, then two radially opposing holes are selected so that the ends of packing bolts 38 may engage the surface 14. Referring to FIG. 1, it should thus be understood that the two threaded passageways 26 lying beneath the square heads 40 were selected since planar surface 14 is immediately beneath each of these passageways, while only a portion or none of the surface 14 is immediately beneath the other two threaded passageways, which subsequently will contain bolts 48.

Once the packing bolt holes have been selected, a drill may be used to form a conical-shaped aperture or indentation 42 in the valve body directly beneath one of the selected holes. Thereafter, the packing 56, packing follower 54, and packing bar 52 are slipped over the valve stem 34. One packing bolt 38 having a conical end is then selected for threading into the passageway 26 adjacent aperture 42, so that the end of the bolt 38 fits within the aperture and thereby prevents inadvertent rotation of base 24 with respect to body 12.

The remaining packing bolt is threaded into the radially opposing passageway 26. Both bolts 38, which will include packing nuts 58 respectively threaded thereon above packing bar 52, are then hand-tightened and "backed-off" slightly until of the four sides of each head 40 is parallel with the center line passing between the remaining two threaded apertures 26 in the bonnet base 24.

Thereafter, the yoke 44 is threaded onto the valve stem until its lower surface passes slightly above the square heads of bolts 38. Valve stem 38 is then rotated with the yoke 44 rotationally fixed in the position as shown in FIG. 1, thereby lowering the yoke between the square heads 40. At this stage, it should be understood that side surfaces 62 of the yoke are parallel with and very close to aligned edges of the heads 40, so that with the yoke axially positioned as shown in FIG. 2, neither of the heads 40 and thus the bolts 38 can rotate with respect to bonnet base 24.

Once the yoke 44 has been installed, the sleeve-like yoke supports 50 are positioned over the two remaining threaded passageways 26, and yoke bolts 48 passed therethrough and threaded to bonnet base 24 to form a structurally rigid bonnet assembly 68. The handle 60 may thereafter be installed, and the packing nuts 58 each lowered to exert the desired compressive force on the packing 56. At this stage, the OS&Y valve is ready for use.

It should be understood that a reliable OS&Y valve is provided which is structurally at least as sound as a conventional OS&Y valve, although the valve body and pocket design of a conventional valve body has been employed. Moreover, the reliability of the valve has been improved by providing a metal-to-metal bonnet base/valve body seal, with a elastomeric backup seal, each of which isolates fluid in the valve from the threaded connection. It should be understood that this backup seal arrangement is preferable, although optional, and either a metal-to-metal seal alone or a elastomeric seal alone could be used to isolate the fluids in the valves from the threaded connection.

As another alternative to the preferred embodiment described above, a plurality of indentations could be spaced around the perimeter of the valve body pocket, with each indentation radially positioned for receiving one of the bonnet bolts (depending on the angular position of the bonnet base relative to the valve body) and thereby rotationally lock the bonnet base to the valve body. A disadvantage of this technique is that the desired torquing of the bonnet base to the valve body will have to be altered to insure that a threaded passageway of the bonnet lies directly over one of the previously established indentations in the valve body.

It is also within the concept of the present invention to utilize a yoke bolt rather than a packing bolt to provide the desired action of locking (limiting) rotation of the bonnet base to the valve body. In this case, the indentation in the valve body would be provided directly beneath a selected threaded bonnet base passageway intended to receive a yoke bolt, and accordingly the selected yoke bolt receiving passageways in the bonnet base would have the desired "meat" of the valve body directly beneath this yoke receiving passageway. The previously described embodiment is preferred, however, since it is desirable, in either case, to lock (limit) rotation of the packing bolts (in part to better enable breaking loose a packing nut corroded thereto), and thus the previously described embodiment, by locking the packing bolt, also inherently locks the bonnet base to the valve body.

As still another alternative to the preferred embodiment, a jamb nut or other locking technique may be utilized to minimize the likelihood of inadvertent rotation of the bonnet bolt. Again, the embodiment previously disclosed is preferred, however, since it is virtually impossible in the preferred embodiment for the packing bolts to inadvertently rotate and thereby allow the bonnet base to rotate with respect to the valve body.

The elastomeric seal 32 may be fabricated from any suitable thermoplastic material, such as Teflon, or other conventional pliable, compressible or elastomeric sealing material, such as Graphoil. The selected material for the compressible seal 56 may be identical to the selected material for seal 32, with the material selection taking into consideration the range of characteristics for the intended fluid to be passed through the valve, expected valve life, and costs.

Other modifications of the present invention should be readily apparent and will be suggested by the above disclosure. For example, the configuration of the heads of the bolts 38 need not be square, since other configurations could be used to nevertheless prevent rotation of the bolts due to engagement with the side surfaces of the yoke. As a further example, various conventional power controls may be used to rotate the valve stem.

Although the invention has been described in terms of the specified embodiments which are set forth in detail, it should thus be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An OS&Y valve of the type including a valve body having an inlet port, an outlet port, and a valve seat, a bonnet base securable to the valve body and having an aperture for receiving a valve stem, the valve stem carrying a sealing member for sealing engagement with the valve seat upon rotation and axial movement of the valve stem with respect to the valve body, a compressible sealing material positioned within an upwardly extending annulus between the valve stem and the bonnet base for sealing engagement therebetween, an axial movable and selectively positionable packing bar for controlling axial compression of the sealing material, and a yoke secured to the bonnet base for threadably receiving the valve stem, the valve further comprising:

the valve body having a planar upper face, a cavity adjacent the planer upper face and extending into the valve body, and a pocket having threaded sidewalls axially spaced between the planar upper face and the valve seat, the pocket further defining a metallic sealing surface axially spaced opposite the planar upper face with respect to the threaded sidewalls;

the bonnet base having a threaded portion for engagement with the threaded sidewalls of the valve body pocket, a planar base surface, a plurality of threaded passageways, and a metallic end surface for sealing engagement with the metallic sealing surface of the valve body;

an axial spacing between the planar base surface and the metallic end surface of the bonnet base being such that the metallic end surface contacts and sealingly engages the metallic sealing surface of the valve body when the planar base surface of the bonnet base engages the planar upper face of the valve body;

a packing bolt threaded to one of the plurality of threaded passageways in the bonnet base and passing through the planar upper face of the valve body and extending into the cavity in the valve body for limiting inadvertent axial rotation of the bonnet base relative to the valve body;

removable securing means for rigidly connecting and disconnecting the yoke and the bonnet base; and a side surface of the yoke for engaging a non-circular surface of the parking bolt and preventing inadvertent rotation of the packing bolt.

2. The OS&Y valve as defined in claim 1, wherein the removable securing means comprises:
 a pair of yoke supports fixed between the yoke and the bonnet base, each of the yoke supports having a through passageway; and
 a pair of corresponding yoke bolts positionable within the through passageways of the yoke supports and in other of the plurality of threaded passageways in the bonnet base for rigidly securing the yoke to the bonnet base.

3. The OS&Y valve as defined in claim 1, further comprising:
 an elastomeric backup sealing ring axially positioned between the threaded sidewalls of the pocket in the valve body and the valve seat for sealing engagement between the valve body and the bonnet base.

4. The OS&Y valve as defined in claim 1, wherein:
 the plurality of threaded passageways in the bonnet base includes at least four threaded passageways; and
 two radially oppositely positioned of the at least four threaded passageways receiving corresponding packing bolts; and
 another two radially oppositely positioned of the at least four threaded passageways receiving corresponding yoke bolts.

5. The OS&Y valve as defined in claim 1, wherein the axial spacing between the planar base surface and the metallic end surface of the bonnet base is such that deformation occurs between the metallic sealing surface of the valve body and the metallic end surface of the bonnet base when the planar base surface of the bonnet base engages the planer upper surface of the valve body upon torqued rotation of the bonnet base relative to the valve body.

6. The OS&Y valve as defined in claim 5, wherein axial deformation between the metallic sealing surface of the valve body and the metallic end surface of the bonnet base is in the range of from 0.008 to 0.017 inches.

7. The OS&Y valve as defined in claim 1, further comprising:
 another packing bolt threaded to another of the plurality of threaded passageways in the bonnet base for guiding axial movement of the packing bar.

8. The OS&Y valve as defined in claim 1, wherein the packing bolt has a rectangular head with a head surface for engaging the side surface of the yoke adjacent thereto to prevent inadvertent rotation of the packing bolt.

9. A bonnet assembly for a valve of the type including a valve body having an inlet port, an outlet port, a valve seat, a planar upper face, and a pocket having threaded sidewalls axially spaced between the planar upper face and the valve seat, the bonnet assembly comprising:
 a bonnet base having a threaded portion for engagement with the threaded sidewalls of the valve body pocket, a central aperture, a planar base surface, and a plurality of threaded passageways;
 a valve stem positionable in the central aperture of the bonnet base and carrying a sealing member for sealing engagement with the valve seat;
 a compressible sealing material in an annulus between the valve stem and bonnet base for sealing engagement therebetween;
 an axially movable and selectively positionable packing bar for controlling axial compression of the sealing material; a packing bolt for removably interconnecting the packing bar and the bonnet base such that rotation of the packing bolt moves the packing bar axially with respect to the bonnet base
 a yoke secured to the bonnet base for threadably receiving the valve stem;
 a bolt threaded to one of the plurality of threaded passageways in the bonnet base for passing through the planar upper face of the valve body and extending into a cavity in the valve body for limiting inadvertent axial rotation of the bonnet base relative to the valve body;
 a head of the packing bolt having a non-circular side surface; and a side surface on the yoke for engaging the non-circular side surface of the head of the packing bolt and preventing inadvertent rotation of the packing bolt.

10. The bonnet assembly as defined in claim 9, further comprising:
 a pair of yoke supports fixed between the yoke and the bonnet base, each of the yoke supports having a through passageway; and
 a pair of corresponding yoke bolts positionable within the through passageways of a respective yoke support and in other of the plurality of threaded passageways in the bonnet base for rigidly securing the yoke to the bonnet base.

11. The bonnet assembly as defined in claim 9, further comprising:
 a metallic end surface on the bonnet base for sealing engagement with the valve body;
 an axial spacing between the planar base surface and the metallic end surface of the bonnet base being such that the metallic end surface contacts and sealingly engages the valve body when the planar base surface of the bonnet base engages the planar upper face of the valve body.

12. The bonnet assembly as defined in claim 9, further comprising:
 an elastomeric backup sealing ring axially positioned between the threaded sidewalls of the pocket in the valve body and the valve seat for sealing engagement between the valve body and the bonnet base.

13. The bonnet assembly as defined in claim 9, further comprising:

the plurality of threaded passageways in the bonnet base includes at least four threaded passageways; and two radially oppositely positioned of the at least four threaded passageways receiving corresponding packing bolts; and another two radially oppositely positioned of the at least four threaded passageways receiving corresponding yoke bolts.

14. A method of assembling an OS&Y valve, comprising:

providing a valve body with an inlet port, an outlet port, a planar upper face, a pocket having threaded sidewalls, and a valve seat axially spaced opposite the planar upper face with respect to the threaded sidewalls;

providing a bonnet base having a threaded portion for engagement with the threaded sidewalls of the valve body pocket, a planar base surface, a plurality of threaded passageways, and a central aperture;

inserting a valve stem carrying a sealing member for sealing engagement with the valve seat within the central aperture of the bonnet base;

threading the bonnet base to the threaded sidewalls of the valve body pocket;

thereafter providing a cavity in the valve body directly beneath a selected one of the threaded passageways in the bonnet base;

thereafter positioning a bolt into threaded engagement with one of the threaded passageways in the valve body, through the planar upper face of the valve body, and into the cavity in the valve body has been inserted;

placing a compressible sealing material in an annulus between the valve stem and the bonnet base;

positioning a packing bar on the valve stem;

thereafter positioning a packing bolt through an aperture in the packing bar and into threaded engagement with the another one of the passageways in the valve body, threading a yoke to the valve stem; thereafter removably securing the yoke to the bonnet base rotatably securing the position of the yoke while rotating the valve stem, thereby lowering the yoke with respect to a head on the packing bolt, such that the packing bolt is prevented from rotating due to engagement of the head of the packing bolt and a side surface of the yoke; and adjusting the axial position of the packing bar relative to the packing bolt to control axial compression of the sealing material.

15. The method as defined in claim 14, further comprising:

providing a metallic end surface on the bonnet base;

rotating the bonnet base relative to the valve body to bring the metallic end surface into sealing engagement with the valve body when the planer upper face of the valve body engages the planar base surface of the bonnet base.

16. The method as defined in claim 14, wherein the step of removably securing the yoke to the bonnet base comprises:

positioning a pair of yoke supports each having a through passageway between the yoke and the bonnet base; and positioning a corresponding pair of yoke bolts within the yoke supports and into threaded engagement with other of the plurality of passageways in the bonnet base.

17. The method as defined in claim 14, further comprising:

the step of providing the bonnet base includes providing at least four threaded passageways therein; and the step of positioning the packing bolt includes positioning a pair of packing bolts in selected two radially oppositely positioned of the at least four threaded passageways having a portion of the valve body directly below the selected two passageways.

* * * * *